(12) United States Patent
Di Fabbrizio et al.

(10) Patent No.: US 8,774,387 B2
(45) Date of Patent: Jul. 8, 2014

(54) SYSTEM AND METHOD FOR AVOIDING HOLD TIMES ON A TELEPHONE CALL

(75) Inventors: Giuseppe Di Fabbrizio, Florham Park, NJ (US); Bernard S. Renger, New Providence, NJ (US); Benjamin J. Stern, Morris Township, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1762 days.

(21) Appl. No.: 11/765,712

(22) Filed: Jun. 20, 2007

(65) Prior Publication Data

US 2008/0317234 A1    Dec. 25, 2008

(51) Int. Cl.
*H04M 3/00* (2006.01)
*H04M 5/00* (2006.01)

(52) U.S. Cl.
USPC ............ 379/211.01; 379/265.01; 379/265.05; 379/266.01

(58) Field of Classification Search
USPC ................. 379/211, 265.01, 265.09, 266.01, 379/265.02, 211.01, 265.05, 265.11
See application file for complete search history.

(56) References Cited

U.S. PATENT DOCUMENTS

| | | | |
|---|---|---|---|
| 5,946,388 A * | 8/1999 | Walker et al. ............ | 379/266.01 |
| 7,426,268 B2 * | 9/2008 | Walker et al. ............ | 379/266.01 |
| 2004/0208307 A1 * | 10/2004 | Walker et al. ............ | 379/265.01 |
| 2004/0228470 A1 * | 11/2004 | Williams et al. ......... | 379/266.01 |
| 2006/0245578 A1 | 11/2006 | Bienfait et al. | |
| 2006/0245579 A1 | 11/2006 | Bienfait et al. | |
| 2007/0071223 A1 * | 3/2007 | Lee et al. ................. | 379/265.02 |
| 2008/0037764 A1 * | 2/2008 | Lee et al. ................. | 379/266.01 |
| 2009/0003584 A1 * | 1/2009 | Walker et al. ............ | 379/265.09 |

* cited by examiner

*Primary Examiner* — Thjuan K Addy
(74) *Attorney, Agent, or Firm* — Fay Kaplun & Marcin, LLP

(57) ABSTRACT

A method and system including receiving a communication from a source, the communication including a request to connect to a destination, connecting, via a communication link, to the destination, detecting an event on the communication link to the destination, and connecting the source to the destination after detecting the event.

14 Claims, 4 Drawing Sheets

FIG. 4

SYSTEM AND METHOD FOR AVOIDING HOLD TIMES ON A TELEPHONE CALL

BACKGROUND

With the growing capabilities of communication systems and technologies, companies and organizations have increasingly gravitated toward providing customer service through telecommunications and calling centers. Many businesses and organizations implementing such systems, however, are inundated with calls on a regular basis from customers who need immediate attention or prefer communicating via telephone. For example, many on-line retailers provide a customer service hotline for order status inquiries or complaints. Depending on the popularity of the retailer, such a customer service hotline may receive hundred or thousands of calls a day. Consequently, those calling a customer service center may be required to wait in a queue for tens of minutes before a live agent is available to address their concerns.

However, callers are often in a situation where the assistance of the agent is essential to solve a pending problem or issue, such as a billing error or a product malfunction. Thus, the caller may feel that he has no choice but to wait on hold, in a caller queue. In addition, the caller generally must stay in close proximity to their telephones during these long hold times in order to know when an agent has picked up their call. A caller is thus limited in their activities until the call is fielded and their concerns are resolved. Even with the mobility of cellular telephones, a caller must still stay within a particular vicinity of the phone in order to detect that a live agent has come on the line. Additionally, long hold times for a mobile telephone may translate to significant costs as many cellular networks charge mobile phone usage by the minute.

SUMMARY OF THE INVENTION

A method including receiving a communication from a source, the communication including a request to connect to a destination, connecting, via a communication link, to the destination, detecting an event on the communication link to the destination, and connecting the source to the destination after detecting the event A device including a user interface receiving destination information from a user, a transceiver configured to place and receive telephone calls, a processor instructing the transceiver to place a telephone call to a destination based on the destination information, wherein the processor monitors the telephone call to detect an event and generate an indication based on the detection of the event, a user output module receiving the indication and providing an output to the user, and a user communication module being connected to the telephone call by the processor A computing device including a processing module instructing a transceiver to place a telephone call to a destination based on destination information received from a source, wherein the processing module monitors the telephone call to detect an event and generate an indication based on the detection of the event, and a computer readable storage medium. The computer readable storage medium includes a set of instructions executable by the processing module, wherein the set of instructions is operable to receive a communication from the source, the communication including a request to connect to the destination, connect, via the transceiver, the telephone call to the destination, detect the event on the telephone call to the destination, and connect the source to the destination after detecting the event.

DETAILED DESCRIPTION

The present invention may be further understood with reference to the following description of exemplary embodiments and the related appended drawings, wherein like elements are provided with the same reference numerals. The exemplary embodiments of the present invention are related to systems and methods for greatly reducing or eliminating the time in which a caller (e.g., a user) spends waiting on hold to speak to an operator (e.g., customer service representative ("CSR") of a call center of a company, government agency, etc.). Specifically, the exemplary embodiments of the present invention are related to systems and methods for allowing a user to use a reciprocal holding ("RH") system when the user is calling a destination experiencing long hold times. The RH system may take over a call on hold from the user, effectively maintaining the hold for the user until a CSR is available. Accordingly, the RH system may allow the user to disconnect (i.e., hang up) from the call while the RH system is in the caller queue for the user. Once the CSR is available, the RH system may notify the user and connect the user to the CSR. As described in further detail below, one exemplary embodiment of the present invention may be implemented into a Voice over Internet Protocol ("VoIP") enabled telephone. Throughout the detailed description of the present invention, the term "call" may refer to any communication call placed within a telecommunication network, such as a plain old telephone service ("POTS") call, a session initiation protocol ("SIP") call, etc.

Figure 1:
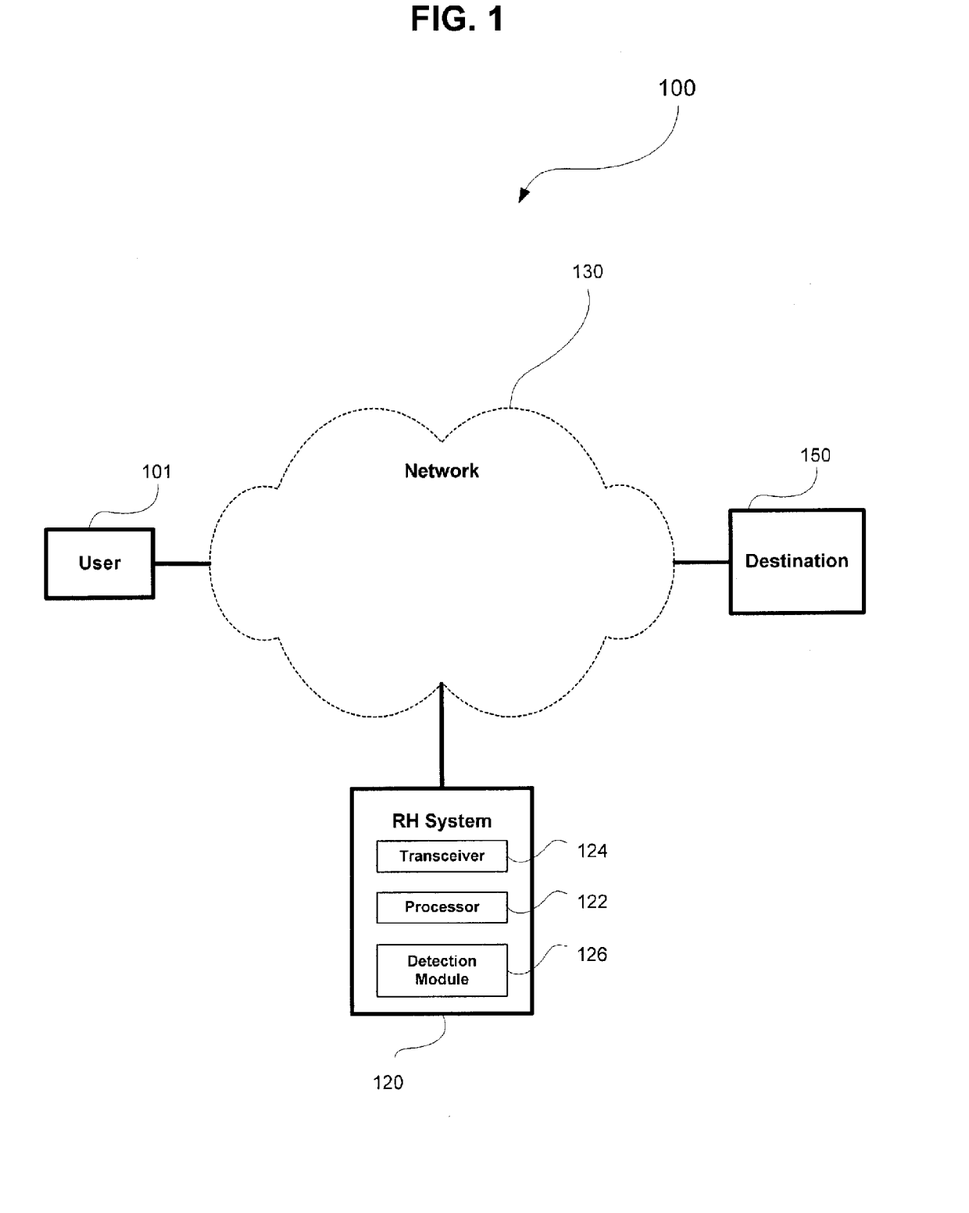
FIG. 1 shows an exemplary system for avoiding hold times while maintaining a call to a destination according to the present invention.

FIG. 1 shows an exemplary system 100 for avoiding hold times while maintaining a call to a destination 150 according to the present invention. The exemplary system 100 allows for a requesting party, such as a user 101 waiting to speak to a CSR, to transfer a call on-hold to a holding server, such as an RH system 120. According to the exemplary embodiment of the present invention, the user 101 may call a telephone number (e.g., an 8XX number to a company call-center) of a receiving party, such as the destination 150.

The user 101 may use a variety of communication devices to initiate the call to the destination 150. These communication devices may include, but are not limited to, a mobile telephone, a landline telephone, a personal computer ("PC") and similar devices. Communication devices may generally be connected to a communication network 130 to facilitate data and communication transfers between devices on the same or different networks. Various types of communication networks 130 may include cellular networks, land-based telephone networks, computer networks, etc. Computer networks may further include either wide area networks ("WAN") or local area networks ("LAN") or a combination of both. The different types of communication networks 130 may also use differing communication protocols. For example, cellular networks may abide by standards such as GSM or CDMA, whereas computer networks may implement Ethernet protocols, etc. In another example, a communication network may implement VoIP communications, allowing a user of PC to use a VoIP-enabled softphone application in order to conduct telecommunications. Additionally, a communication system may further implement methods for converting transmissions sent using a particular protocol into transmissions compatible with another protocol. As such, a single communication network 130 may be able to facilitate communications from sources using multiple protocols.

Using the various communication devices described above, a requesting party may communicate their request through an interface implemented on the RH system 120. The RH system 120 may act as a communication conduit and facilitator between the requesting party (i.e., user 101) and the receiving party (i.e., destination 150). The RH system 120 may include numerous types of servers such as Internet servers, web servers, application servers, audio/video servers, VoiceXML servers, VoIP-PSTN gateways, telnet servers, and/or any combinations thereof.

According to one exemplary embodiment of the present invention, the RH system 120 may include an Internet server for providing an Internet interface with which a requesting party may enter information related to registering and maintaining a preference profile as well as additional service configurations. In another exemplary embodiment, the RH system 120 may be an application server that provides an application-based interface to the requesting party for initiating and facilitating communications with the receiving party. One of skill in the art will understand that various networking components may be used throughout the exemplary system 100 for handling calls. These networking components may include a Voice Extensible Markup Language ("VXML") server (not shown), a VoIP-Public Switched Telephone Network ("PSTN") gateway (not shown), etc.

In one example, the user 101 may place calls using personal computers with one or more peripherals (e.g., microphone and earphones/speakers). It should be noted that the exemplary embodiments of VoIP phones according to the present invention are not limited to personal computers. The user 101 may place calls through alternative devices utilizing a VoIP client, such as a PSTN phone set connected through terminal adapters, a special-purpose IP handheld phone, etc. The personal computers may also implement a softphone application that can parse an Internet data stream and display a variety of transmitted information. Thus, when the RH system 120 transmits communication data relating to personal information of the user 101, this information may be viewed or displayed through the softphone application.

The components of the exemplary system 100 described in FIG. 1 may use and implement a variety of telecommunication devices, networks and technologies and are not limited to VoIP systems. For example, a requesting party may use a telephone operating through the PSTN to submit a service request.

According to the exemplary embodiment of the RH module 120, the RH system 120 may include a processor 122, a transceiver module 124, and a detection module 126. The transceiver module 124 may serve as a hub for all outgoing and incoming communications from the user 101, including requests to establish and/or maintain a communication link with a specific destination, such as destination 150. When the user 101 is on hold with the destination 150, or in an alternative embodiment, when the user 101 anticipates a hold-time prior to calling the destination, the transceiver module 124 may receive a request from the user 101 to activate the RH system 120. The request may then be forwarded from the transceiver module 124 to the processor 122 for processing. Specifically, the request may indicate to the processor 122 that the RH system 120 may take over, or alternatively, may initiate, a communication link (e.g., a telephone call) to the destination 150.

Once the RH system 120 has established a communication link with the requested destination 150, the RH system 120 may maintain an on-hold connection with the destination 150 while the user 101 may disconnect from any connections with the RH system 120 and/or the destination 150. The detector module 126 may be capable of detecting an event over a communication link between the RH system 120 and the destination. According to an exemplary embodiment of the present invention, the detected event may be a voice command from a CSR at the destination 150 or a touch-tone signal received from the destination. Thus, once the processing module 122 verifies the occurrence of the event via detection module 126, the transceiver module 124 of RH system 120 may transmit a notification back to the user 101 in order to bridge the user 101 onto the communication link with the destination 150. The functionalities for each of the components within the exemplary system 100 will be described in further detail below.

Figure 2:
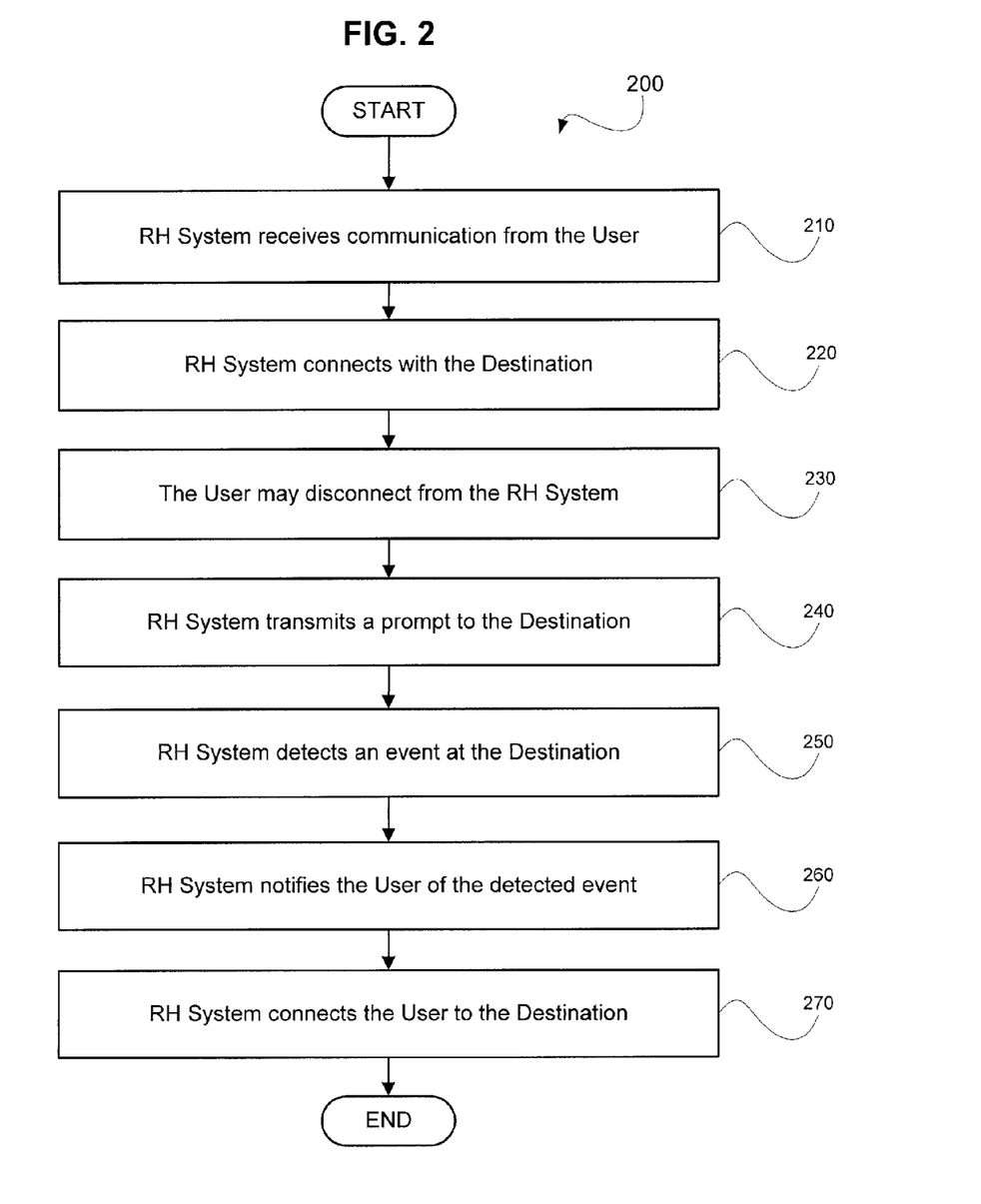
FIG. 2 shows an exemplary method for maintaining an on-hold communication link with the destination via the reciprocal holding system according to the present invention.

FIG. 2 shows an exemplary method 200 for maintaining an on-hold communication link with the destination 150 via the RH system 120 according to the present invention. The exemplary method 200 will be described with reference to the exemplary system 100 of FIG. 1. As described above, an exemplary embodiment of the RH system 120 may place the functionality on a network platform. Accordingly, the method 200 may describe the control of a communication link between the user 101 and the RH system 120 in a network.

As described above, the RH system 120 may be capable of both receiving and transmitting communications between the user 101 and the destination 150. Specifically, the RH system 120 may receive an initial communication from the user 101, wherein the initial communication requests the RH system 120 to connect with a certain destination, such as the destination 150. The RH system 120 may transmit a subsequent communication to the destination 150, and ultimately reconnect with the user 101, thereby bridging the communication between the destination 150 and the user 101.

In step 210, the RH system 120 may receive a communication (e.g., a telephone call) from the user 101. The communication for the user 101 may include information pertaining to a desired call destination of the user 101, such as a telephone number of the destination 150. The user 101 may transmit this destination information to the RH system 120 using any type of telecommunication device, such as POTS telephone or a VoIP-enabled handset. According to the exemplary embodiment of the method 200, the user 101 may expect that there will be significant hold times at the desired destination 150. Thus, the user 101 may call the RH system 120 prior to placing a call to the destination 150. Accordingly, the RH system 120 may only need to be invoked by the user 101 when the user 101 expects to be on hold for a long period of time so the RH system 120 may not negatively impact regular calling operations.

However, an alternative embodiment may allow the user 101 to communicate with the RH system 120 while the user 101 is currently on hold with the destination 150. Thus, the user 101 may instruct the RH system 120 to take over the on-hold communication with the destination 150. This alternative embodiment will be described in further detail in FIG. 3 and method 300 below.

In step 220, the RH system 120 may establish a connection with the destination 150 based on the destination information provided by the user 101. Specifically, the RH system 120 may dial the telephone number of the destination 150 to establish the connection within a telecommunications queue (e.g., a call center queue) at the destination 150. Thus, the RH system 120 may maintain the on-hold call for the user 101.

In step 230, the user 101 may disconnect from the RH system 120. Specifically, the user 101 may hang up the handset or simply instructs the RH system 120 to disconnect the connection with the user 101 (e.g., activating a soft button on a VoIP application). For example, the RH system 120 may listen for a special touch-tone sequence (e.g., *74 [*RH]) and/or voice command from the user 101 to indicate that the user 101 is on hold and is requesting to disconnect from the call. Accordingly, the user 101 may now avoid waiting on hold with the destination 150 for the next available CSR. As opposed to maintaining a communication link with the destination 150 while the call remains in the call center queue, the user 101 is free to go about his business while the RH system 120 maintains the on-hold call. It is noted that step 230 may be performed automatically by the RH system 120 upon connecting with the destination 150. In other words, after receiving the specific destination information from the user 101, the communication link between the user 101 and the RH system 120 may be disconnected immediately. Thus, the RH system 120 may then contact the destination 150 while disconnected from the user 101.

In step 240, the RH system 120 may transmit a prompt to the destination 150. Specifically, the RH system 120 may continuously inform the destination 150 of the existence of the user 101 and may also provide a CSR at the destination 150 with instructions on how to alert the user 101 of the availability of the CSR. The prompt may inform a recipient (e.g., a CSR) at the destination 150 that a caller (e.g., the user 101) is waiting to speak to the recipient. In addition, the prompt may instruct the recipient to enter a touch-tone number or sequence, or alternatively, provide a voice command, in order to notify the caller that the recipient is ready. For example, the prompt may be a repeating message stating, "A caller is waiting to speak with you. Please press a touch-tone button or say 'Ready' and the caller will return to the phone." The prompt may also identify the name and/or company of the caller to the recipient. Information regarding the caller (e.g., name, company, return telephone number, etc.) may be entered by the caller either upon activated the RH system 120, or may be stored within a memory of the RH system 120 prior to use.

In step 250, the RH system 120 may detect an occurrence of an event over the connection with the destination 150. Specifically, the CSR at the destination 150 may generate the required event in response to the prompt transmitted by the RH system 120. As described above, the event may be the CSR providing a voice command or dialing a specific touch-tone button or sequence of buttons. Alternatively, the occurrence of an event may simply be the CSR at the destination 150 answering the call. Thus, the RH system 120 may be configured to detect the occurrence of such an event. According to one embodiment of the present invention, the RH system 120 may transmit an additional message upon the detection of the event. For example, the RH system 120 may transmit a message stating, "You are now being connected with the caller." Similar to the prompt transmitted in the step 240, this message may also identify the name and/or company of the caller.

In step 260, the RH system 120 may notify the user 101 of the occurrence of the event. Specifically, when the RH system 120 detects the presence of the CSR at the destination 150 (e.g., the voice prompt, the touch-tone button, etc.), the RH system 120 may transmit a callback communication to the user 101. The callback communication may activate an alert to the user 101 such as a standard or distinctive ringtone. In another example, a flashing message may appear on a computer screen or a VoIP-enabled telephone screen. According to various embodiments of the present invention, the RH system 120 may obtain the callback telephone number of the user 101 through a variety of manners. For example, the RH system 120 may be configured to automatically use the automatic number identification ("ANI") from the communication device used by the user 101. In another example, the RH system 120 may query the user 101 for one or more callback telephone numbers prior to the user 101 disconnecting from the RH system 120. In a further example, the user 101 may establish a pre-registered personal identification number ("PIN") with the RH system 120. According to this further example, the user 101 may provide a callback telephone number during an administrative interaction with the RH system 120. For example, this administrative interaction may take place before the call using a web page. Furthermore, the administrative interaction may also include turning on the multiple callback number scenario. The PIN may allow the RH system 120 to properly associate the user 120 with the proper callback number.

In step 270, the RH system 120 may connect the destination 150 with user 101. In other words, the user 101 may be bridged into the existing communication link between the RH system and CSR at the destination 150. According to one embodiment of the present invention, once the user 101 is connected to the destination, the RH system 120 may then disconnect itself from the communication link. However, alternative embodiments of the present invention may allow the RH system 120 to remain connected. For example, certain call-processing methods, such as hairpinning, may prevent the RH system 120 from disconnecting from the communication link. Specifically, if the user 101 is connected to the RH system 120 via a first port of the RH system 120 (e.g., such as via the VoiceXML server) and the destination 150 is connected to the RH system 120 via a second port of the RH system 120, then hairpinning may refer to connecting the two ports while the RH system 120 remains connected. Furthermore, it should be noted that the RH system 120 may dial multiple callback telephone numbers either simultaneously or in a predetermined sequence. For example, the user 101 may place the original call to the RH system 120 from a wired, landline telephone to activate the RH system 120. However, the user 101 may decide to walk away from the landline telephone at some point during the on-hold communication between the RH system 120 and the destination 150. Accordingly, the RH system 120 may transmit an initial call to the landline telephone in which the original call was placed. If the user 101 fails to answer the landline telephone, the RH system 120 may have instructions to transmit a further call to another number, such as the number to a mobile telephone of the user 101. Thus, the use of multiple callback numbers gives the user 101 greater mobility while waiting for the CSR at the destination 150 to become available.

Figure 3:
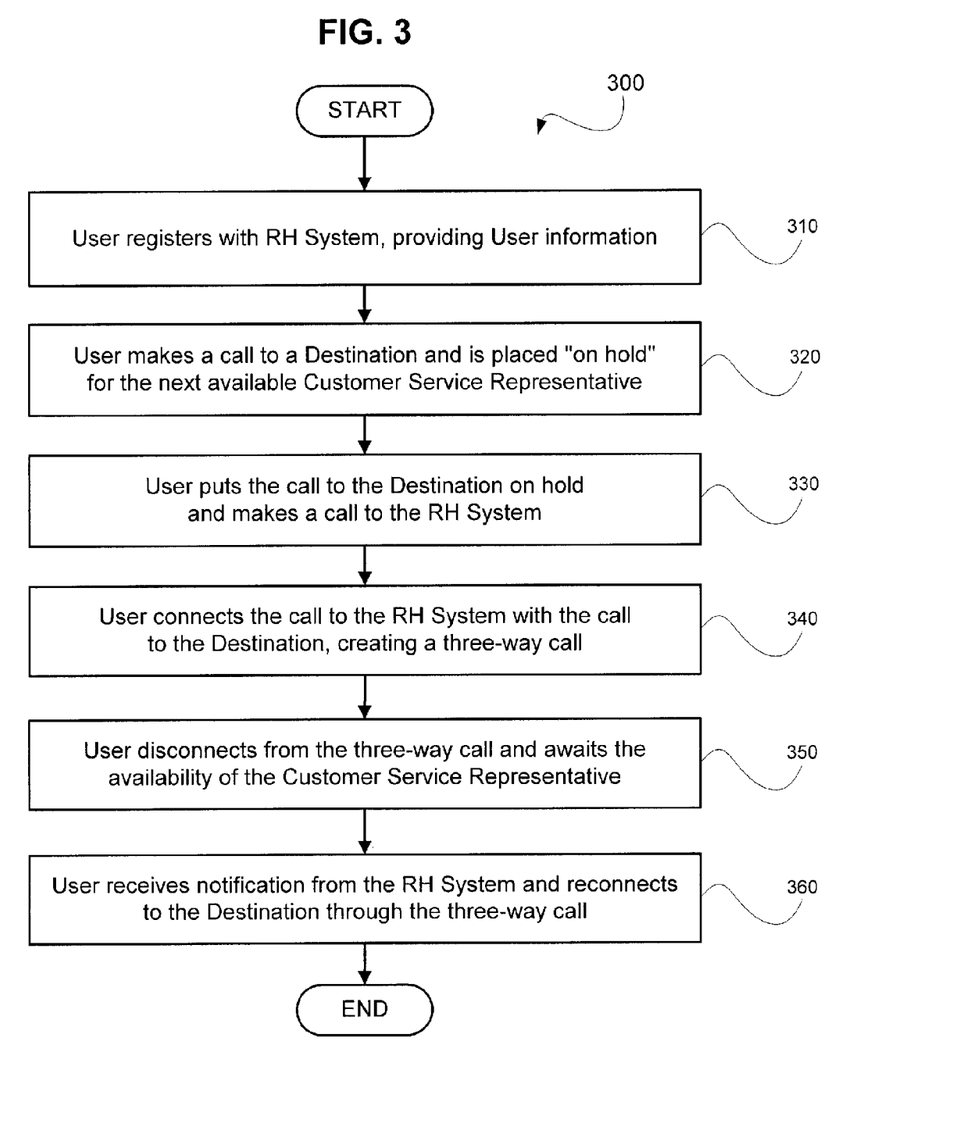
FIG. 3 shows an alternative exemplary method for maintaining an on-hold communication link with the destination via the reciprocal holding system according to the present invention.

FIG. 3 shows an alternative exemplary method 300 for maintaining an on-hold communication link with the destination 150 via the RH system 120 according to the present invention. According to the exemplary method 300, the user 101 may utilize a communication device having a conference calling feature and/or a three-party calling feature. Thus, the user 101 may instruct the RH system 120 to take over an existing on-hold communication with the destination 150.

In step 310, the user 101 may register with the RH system 120. For example, the RH system 120 may utilize application servers and/or web servers for handling various registration options. Specifically, the user 101 may provide information to a database within the RH system 120. This information may include identifiable information, such as the ANI of the primary telephone of the user 101. In addition, the user 101 may also provide additional telephone numbers for the RH system 120 to dial out to, in the event the primary telephone is busy or otherwise unavailable. The additional telephone numbers may direct the RH system 120 to dial a mobile phone, home phone, office phone, etc. Furthermore, the information may instruct the RH system 120 of the sequence or priority of the various telephone numbers. This registration may take place, for example, via a web interface, via a graphical user interface ("GUI") on the communication device or via a separate audio interaction, such as via PSTN or VoIP.

In step 320, the user 101 may use a communication device to place a call with the destination in order to speak to a CSR at the destination 150. Upon connecting with the destination 150, the user 101 may be informed that his call is being placed on-hold for the next available CSR. The destination 150 may even inform the user 101 of an anticipated hold time for speaking with the CSR.

In step 330, the users 101 may place the call to the destination 150 on hold. For example, the user 101 may utilize the conference calling or three-party calling features of the communication device to place the call on hold. According to one embodiment of the present invention, the communication device may be a POTS phone with the local exchange service for three-way calling and conferencing calling. The use of either one of these calling features permits the user 101 to add a second outgoing call to the already connected on-hold call to destination 150. Thus, the second outgoing call may be directed toward activating the RH system 120. Specifically, the user 101 may connect to the RH system 120 while the initial call to the destination 150 is on hold. As opposed to initiating the RH system 120 prior to calling the destination, the exemplary method 300 allows the user 101 to activate the RH system 120 after the user 101 encounters a lengthy hold time.

In step 340, the user 101 may connect the two existing calls between the destination 150 and the RH system 120. The connecting may be performed through a telecommunication function such as a three-party calling function or a conference calling function (i.e., for calls involving more than three parties). Specifically, the user 101 may "conference-in" the RH system 120 into the existing on-hold call with the destination 150. Thus, each of the user 101, the RH system 120, and the destination 150 may be in communication with each other in a three-way telephone call.

In step 350, the use 101 may disconnect (e.g., hang up, drop out) from the three-way telephone call and await notification from the RH system 120. While the user 101 disconnects from the three-way call, the RH system 120 may remain in communication with the destination 150. As described above, the RH system 120 may maintain, or take-over, the on-hold communication with the destination 150 until an event is detected that indicates the availability of a CSR at the destination 150. While the RH system 120 maintains the on-hold communication with the destination 150, the RH system 120 may transmit a prompt to the destination 150. Specifically, the RH system 120 may continuously inform the destination 150 of the existence of the user 101 and may also provide a CSR at the destination 150 with instructions on how to alert the user 101 of the availability of the CSR. The prompt may inform a recipient (e.g., a CSR) at the destination 150 that a caller (e.g., the user 101) is waiting to speak to the recipient. In addition, the prompt may instruct the CSR to enter a touch-tone number or sequence, or alternatively, provide a voice command, in order to notify the caller that the recipient is ready.

In step 360, the user 101 may receive a notification from the RH system 120 that a CSR is available at the destination 150, and the user 101 may reconnect with the three-way call. The notification may be an alert, such as standard or distinctive ringtone. Specifically, the user 101 may receive the alert and then activate (e.g., answer) the communication device. The RH system 120 may inform the user 101 that the communication is no longer on-hold and a CSR at the destination 150 is waiting to connect with the user 101. Once the user 101 is connected with the CSR at the destination 150, the RH system 120 may disconnect (e.g., drop out) from the call. The user 101 may now speak directly to the CSR at the destination 150.

Figure 4:
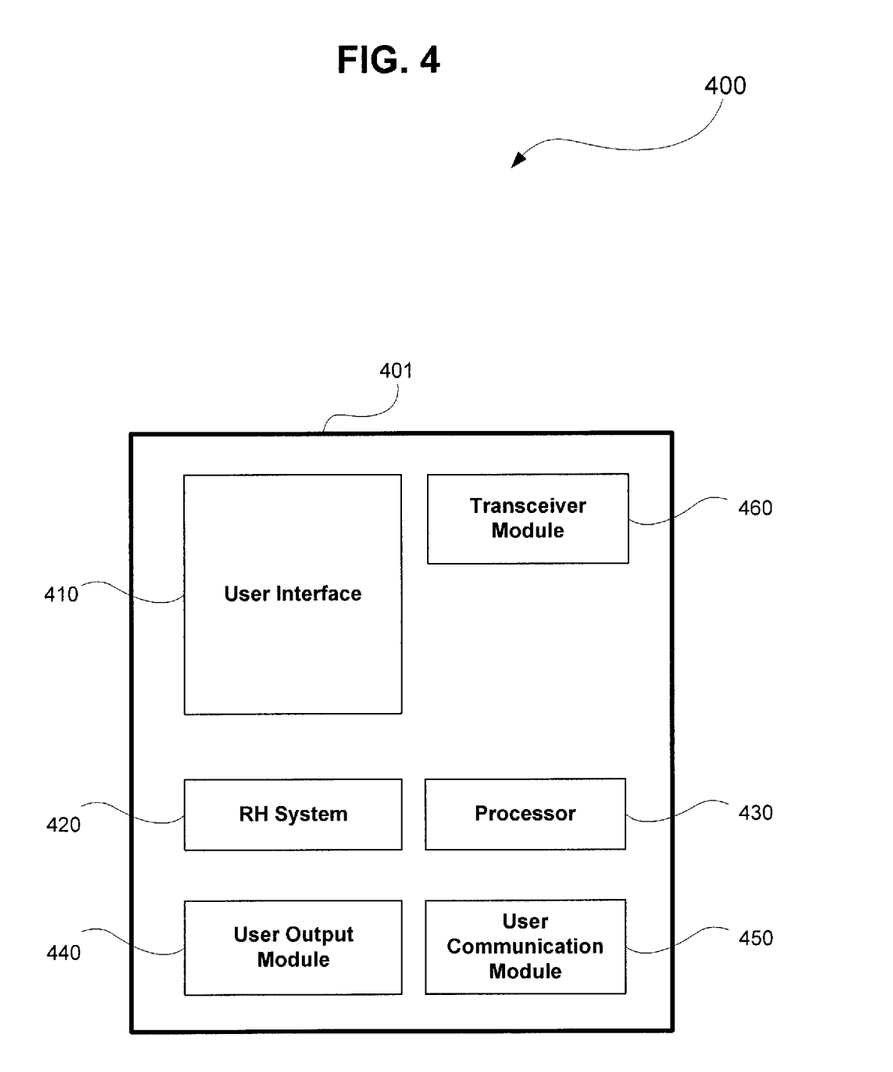
FIG. 4 shows an alternative system for avoiding hold times while maintaining a call to a destination through the use of a device according to the present invention.

FIG. 4 shows an alternative system 400 for avoiding hold times while maintaining a call to a destination 150 through the use of a device 401 according to the present invention. The alternative system 400 allows for a requesting party, such as a user 101 waiting to speak to a CSR, to transfer a call on-hold to a holding server, such as a RH system 420 within the device 401. The device 401 may include a user interface 410, a transceiver module 460, a processor 430, a user output module 440 and a user communication module 450. According to the exemplary embodiment, the device 401 may be a PC or a VoIP-enabled handset. If the user 101 ends up on hold with a destination 150, the user 101 may select an RH function on the phone to activate the RH system 120. Thus, the device 401, itself, may maintain the on-hold communication with the destination on a first virtual line, while the user 101 would be free to disconnect (e.g., hang up) from the first virtual line and place additional calls over an additional virtual line via the device 401.

For VoIP telephony, a programmable softphone on the handset or the PC may include a button and/or an icon that initiates activation of the RH system 420 of the device 401. The RH system 420 may take advantage of various VoIP services and VoIP clients. For example, the user 101 may be a requesting business calling a destination business. As opposed to, or in addition to, standard telephones, the requesting business may have implemented VoIP clients on their desktops or on their mobile telephones. The advantage of the VoIP client is the ease in which the RH system 420 may be integrated through the addition of soft buttons onto the existing VoIP clients. Accordingly, the use of the exemplary embodiment of the present invention for business-to-business use may save both the time and money normally associated with waiting on hold to speak to a CSR at the destination 150.

The user interface 410 of the device 401 may be configured to receive destination information from the user 101 pertaining to the intended destination 150. As described above, the destination information may be a telephone number of the destination 150. Alternatively, the destination information may be a destination SIP address. Thus, the user 101 may simply dial the number or select a specific destination from a contact list (e.g., address and/or phone book) within the user interface 410.

The transceiver module 460 may be configured to place and receive communications (e.g., telephone calls) over a communication link between both the user 101 and the destination 150. Specifically, the transceiver module 460 may be configured to place and receive telecommunication transmissions throughout a telecommunication network. For example, the device 401 may be connected to the network via an Ethernet connection provided by transceiver module 460. In another example, the device 401 may be a wireless device such that the transceiver module 460 includes (or is connected to) an antenna for sending/receiving wireless signals.

The processor 430 may instruct the transceiver to establish communication links with both the user 101 and the destination 150. Specifically, the processor 430 may receive the destination information from the user interface 410 and establish a communication link (e.g., a SIP or telephone call) with the destination 150 based on the destination information. In addition, the processor 430 may monitor the communication link with the destination 150 in order to detect the occurrence of an event. Furthermore, the processor 430 may generate an indication based on the detection of the event. The indication from the processor 430 may be transmitted via the transceiver module 460 over a communication link to the user 101.

According to one exemplary embodiment of the present invention, the processor 430 may receive instructions to monitor the communication link for the occurrence of an event after instructing the transceiver module 460 to establish the communication link with the destination 150. In other words, the user 101 may establish a communication link (e.g., place a call) with the destination 150. Upon being placed on hold by the destination 150, the user 101 may then choose to transfer the on-hold communication using the user interface 410 of the device 401. The processor 430 may receive instructions via the user interface 401 to monitor the on-hold communication for the occurrence of an event, such as a voice-prompt or a specific touch-tone sequence, from the destination 150.

According to an alternative exemplary embodiment of the present invention, the processor 430 may receive instructions to monitor the communication link for the occurrence of an event prior to instructing the transceiver module 460 to establish the communication link with the destination 150. In this embodiment, the user 101 may anticipate that any communication with the destination 150 will be required to be placed on hold. Therefore, before the user 101 establishes a communication link (e.g., placing a call) with the destination 150, the user 101 may preemptively activate the processor 430 via the User Interface. Thus, the processor 430 may receive instructions from the user 101 to monitor the communication link, and then the processor 430 may establish the communication link via the transceiver module 460.

The user output module 440 of the device 401 may receive the indication from the transceiver module 460 and provide an output signal to the user 101 of the device 401. The output signal may be an audible alert, such as a standard or distinctive ringtone, alarm, etc. Alternatively, the output signal may be a silent alert, such as a vibration alert or visual alert observable by the user 101.

The communication module 450 of the device 401 may be connected to the telephone call by the processor 430. The communication module 450 may include communication interfaces, such as microphone and speaker components, in order to allow the user 101 to communicate with a CSR at the destination 150. As described above, the speaker component may be configured to transmit a variety of ringtones dependant on the type of communication the device 401 receives. For example, a standard telephone call may trigger a standard ringtone, while a callback communication from the RH system 120 may trigger a distinctive ringtone.

According to an exemplary embodiment of the present invention, the RH system 120 may use various protocols in order to indicate the state of both the RH system 120 and an existing on-hold communication with the destination 150. In addition to the distinctive ringtone described above, the RH system 120 may transmit a distinctive dial tone to the user 101 if an on-hold communication is still active with the destination 150. That is, if the user picks up the handset, when then RH system 120 is actively attempting to connect a call, the dial tone may be different from the dial tone when the RH system 120 is not actively attempting to connect a call. Thus, the user 101 may reconnect with the RH system 120 to ensure the hold with the destination 150 is still in progress. In addition, the RH system 120 may provide a notification call and/or message to the user 101 if the on-hold communication is dropped or in any other way terminated. Thus, the user 101 may have immediate notification that the RH system 120 is no longer on hold with the destination 150. Furthermore, the user 101 may reconnect with an existing on-hold communication by dialing into the RH system 120 and identifying himself as the user 101 (e.g., automatically through the ANI, manually though the PIN, etc.). According to the VoIP-enable embodiment of the present invention, the user 101 may reconnect with an existing on-hold communication by clicking on an icon over a softphone application.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
    receiving, at an intermediary, a communication from a source, the communication including an indication that the source is waiting in a queue during an attempt a request to connect to a destination, the communication further connecting the intermediary to the destination via a communication link;
    disconnecting the source after receiving the communication;
    sending a notification to the destination indicating that the source has been disconnected and that the source has requested to connect to the destination;
    detecting an event on the communication link to the destination in response to the notification; and
    connecting the source to the destination after detecting the event.

2. The method of claim 1, wherein the communication is a telephone call from the source.

3. The method of claim 2, wherein the detecting occurs after the telephone call has been disconnected.

4. The method of claim 1, further comprising:
    providing a prompt to the destination, wherein the prompt informs the destination on how to generate the event.

5. The method of claim 1, wherein the event is one of a touch-tone input and a voice input.

6. The method of claim 1, further comprising:
    notifying the source when the event is detected.

7. The method of claim 1, wherein connecting the source to the destination is based on one of an automatic number identification of the source, a caller-identification number of the source, a user-identified number by the source, and a pre-registered number by the source.

8. The method of claim 1, further comprising:
    transmitting a notification to the source indicating that the event has yet to be detected while connected, via the communication link, to the destination.

9. A system, comprising:
a receiving module receiving a communication from a source, the communication including an indication that the source is waiting in a queue during an attempt to connect to a destination, the communication further connecting the receiving module to the destination via a communication link, wherein the receiving module disconnects the source after receiving the request;
a notification module sending a notification to the destination indicating that the source has disconnected and that the source has requested to connect to the destination;
a detection module detecting an event on the communication link to the destination in response to the notification; and
a reciprocal holding module connecting the source to the destination after detecting the event.

10. The system of claim 9, wherein the reciprocal holding module provides a prompt to the destination prior to detecting the event on the communication link, wherein the prompt informs the destination on the how to generate the event.

11. The system of claim 10, where the prompt further informs the destination of information relating to the source.

12. A device, comprising:
a user interface receiving, from a user, a communication including an indication that the user is waiting in a queue during an attempt to connect to a destination;
a transceiver configured to place and receive telephone calls, wherein the communication from the user places the transceiver in communication with the user and the destination;
a processor disconnecting the user interface, notifying the destination that the user has disconnected and that the user has requested to connect to the destination, monitors the telephone call to detect an event in response to the notification, and generating an indication based on the detection of the event;
a user output module receiving the indication and reconnecting to the user via the transceiver.

13. A computing device, comprising:
a computer readable storage medium including a set of instructions executable by a processor, the set of instructions operable to:
receive a communication from a source, the communication including an indication that the source is waiting in a queue during an attempt to connect to a destination, the communication further connecting the computing device to the destination;
disconnect the source after receiving the communication;
send a notification to the destination indicating that the source has disconnected and that the source has requested to connect to the destination;
detect the event on the telephone call to the destination in response to the notification; and
connect the source to the destination after detecting the event.

14. The system of claim 9, wherein the receiving module disconnects the source based on one of receiving a disconnect request from the source or receiving the request.

\* \* \* \* \*